United States Patent

[11] 3,617,098

| [72] | Inventor | Heinz Leiber |
| | | Leimen, Germany |
| [21] | Appl. No. | 846,443 |
| [22] | Filed | July 31, 1969 |
| [45] | Patented | Nov. 2, 1971 |
| [73] | Assignee | Teldix GmbH |
| | | Heidelberg, Germany |

[54] INLET VLAVE FOR ANTILOCKING BRAKE CONTROL SYSTEM
8 Claims, 2 Drawing Figs.

[52] U.S. Cl. .................................................. 303/21 F,
   188/181 A, 303/61, 303/68
[51] Int. Cl. ..................................................... B60t 8/12
[50] Field of Search ............................................ 137/598,
   599; 188/152, 152.15, 181; 60/54.5; 303/89, 68,
   84, 21, 6, 61–63

[56] References Cited
UNITED STATES PATENTS

| 2,574,821 | 11/1951 | Forman ........................ | 192/3 X |
| 2,579,904 | 12/1951 | Castner ....................... | 188/152 (.15) |
| 2,638,118 | 5/1953 | Chandler ..................... | 188/152 (.15) X |
| 2,701,035 | 2/1955 | Leichsenring ................ | 188/152 (.15) |
| 3,153,426 | 10/1964 | Milster ........................ | 188/152 (.15) X |

*Primary Examiner*—Milton Buchler
*Assistant Examiner*—John J. Mclaughlin
*Attorney*—Spencer & Kaye

ABSTRACT: The inlet valve of an antilocking control system for vehicle brakes is constructed to possess low-response time and a check valve in parallel with the inlet valve is provided to prevent undesirable check valve action by the inlet valve.

INLET VLAVE FOR ANTILOCKING BRAKE CONTROL SYSTEM

BACKGROUND OF THE INVENTION

In antilocking control systems for vehicle brakes of the type disclosed, for example, in my copending U.S. application Ser. No. 771,079 filed Oct. 28, 1968, now U.S. Pat. No. 3,556,610 a normally open electromagnetic inlet valve is provided between the vehicle master cylinder and an associated wheel brake cylinder. During brake application initiated by the vehicle operator, assuming that sufficient braking effort is applied so as to initiate a control cycle, the inlet valve will close to isolate the wheel brake from the master cylinder whereafter an outlet valve opens to reduce the brake fluid pressure acting at the wheel, the outlet valve then recloses, and, at the end of the control cycle, the inlet valve is reopened. Subsequent cycles may follow. In any event, the response time of the inlet valve must be rapid, in the order of 1 millisecond, which necessitates that the movable element of the valve be of relatively small size and low inertia. This is especially true when considering the relatively low electrical actuating current which is available from the control circuit. As a result, the construction of the electromagnetic inlet valve is restricted to a fixed seat-shiftable valve member type in which the shiftable member is carried by the armature of the electromagnetic actuating device. The armature is normally held in its open condition under light spring pressure in order to assure that a rapid response ensues when the low current available for actuation is delivered.

Under such conditions, the low inertia and light spring loading of the movable portion of the valve renders it susceptible to undergoing a check valve action especially when considering the relatively high pressures which the valve may be called upon to handle, i.e., up to 200 atmospheres gauge. For obvious reasons of safety, the valve is oriented with the movable element located between the valve seat and the wheel brake cylinder so that no possible check valve action may occur to prevent flow of brake fluid to the wheel cylinder. However, if the operator suddenly reduces or removes the brake fluid pressure at the master cylinder, it is possible that the valve will be urged into, or maintained in, the closed condition dependent upon its initial condition by virtue of the pressure differential acting across the valve. The result, of course, is that the braking effort is not reduced or released according to the operator's intention.

SUMMARY OF THE INVENTION

Accordingly, it is a primary object of the present invention to provide an antilocking control system for vehicle brakes of the type described generally above in which means are incorporated to eliminate the possibility of the inlet valve acting as a check valve as a result of sudden reduction in the brake fluid pressure applied by the master cylinder.

Another object of the present invention is to provide a check valve in parallel with the inlet valve of an antilocking system for vehicle brakes in which the check valve is oriented to bypass the inlet valve in the direction from the wheel cylinder side thereof to the master cylinder side thereof.

A further object of the invention is to provide an improved inlet valve arrangement having the check valve associated directly therewith.

A further object of the invention is to provide an integral inlet valve-check valve arrangement as described above wherein the pole piece of the electromagnetic actuating device for the inlet valve incorporates the check valve therein.

Specifically, the invention is embodied in an electromagnetic actuator having a bore therethrough with which a valve seat is associated and wherein the armature of the electromagnetic device carries a valve element which is seated against the seat when the winding of the electromagnetic device is energized, there being a secondary bore through the pole piece which houses the check valve. The check valve includes a head portion and a stem, the stem being received within a collar fitted within the secondary bore and the collar being provided with a semicircular longitudinal groove establishing communication with the secondary bore.

BRIEF DESCRIPTION OF THE DRAWING FIGURES

DETAILED DESCRIPTION OF THE INVENTION

Figure 1:
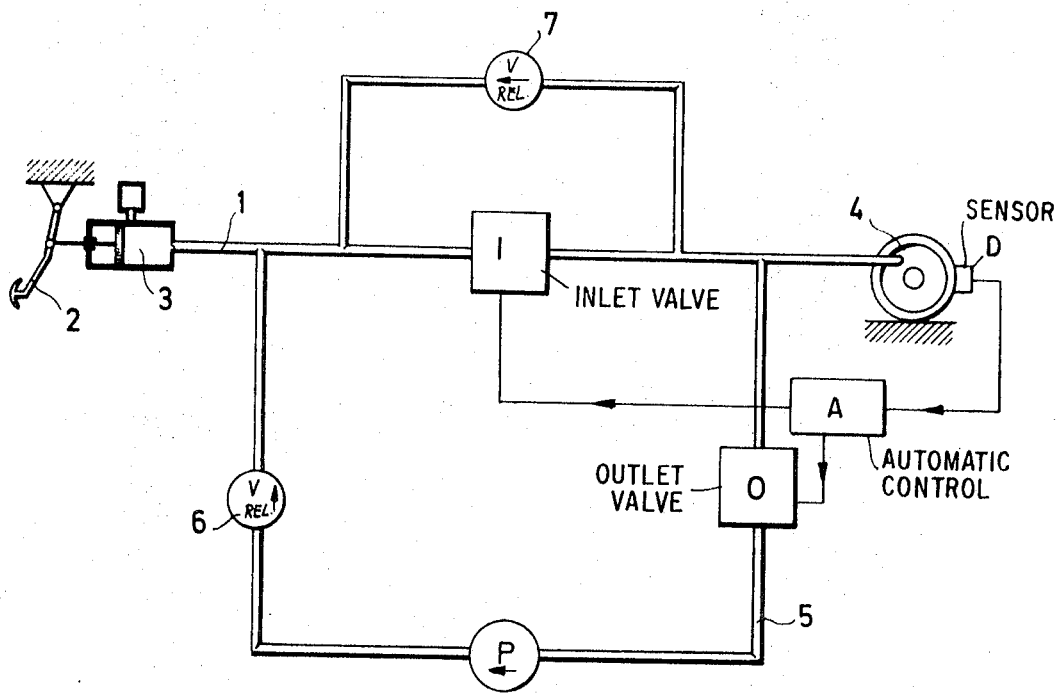
FIG. 1 is a diagrammatic view illustrating a portion of an antilocking control system incorporating an arrangement according to the present invention.

With reference to FIG. 1, a conventional master cylinder 3 is illustrated therein as being capable of actuation under the control of the pedal 2 so that the operator of the vehicle may, in the usual manner, establish braking pressure in the main pressure line 1 leading from the master cylinder to the slave cylinder of an associated wheel 4. In antilocking control systems of the type described, for example in my above-cited copending application, an inlet valve I is interposed in the main pressure line between the master cylinder and the slave cylinder of the wheel 4 and a normally closed outlet valve 0 is connected at a point between the normally open inlet valve I and the slave cylinder to selectively bleed fluid from, and reduce the pressure at, the slave cylinder. The opening and closing of the inlet and outlet valves is controlled by an automatic control mechanism A and the detecting device D which form no part of the present invention and the details of which are not necessary for an understanding of the inlet valve construction hereinafter described. The automatic control device A responds to the output signal generated by the sensing device D which in turn detects the braking condition of the wheel 4.

The outlet valve is provided at its outlet side 5 with a return system which includes a pump P and a suitable check valve 6 so as to return the bled off fluid to the main pressure line 1.

As stated above, the construction of the inlet valve I is such that in order to meet the response time characteristics necessary for successful automatic control operation, it may tend to act as a check valve due to the light weight and low inertia of the movable element of the valve and due to the light biassing spring pressure applied thereagainst, so that the inlet valve may either be forced from an open to a closed condition, or maintained in an already closed condition, in response to a sudden reduction of pressure at the master cylinder 3. According to the present invention, a check valve device 7 is provided in parallel with the inlet valve I to prevent these actions by the inlet valve I.

Figure 2:
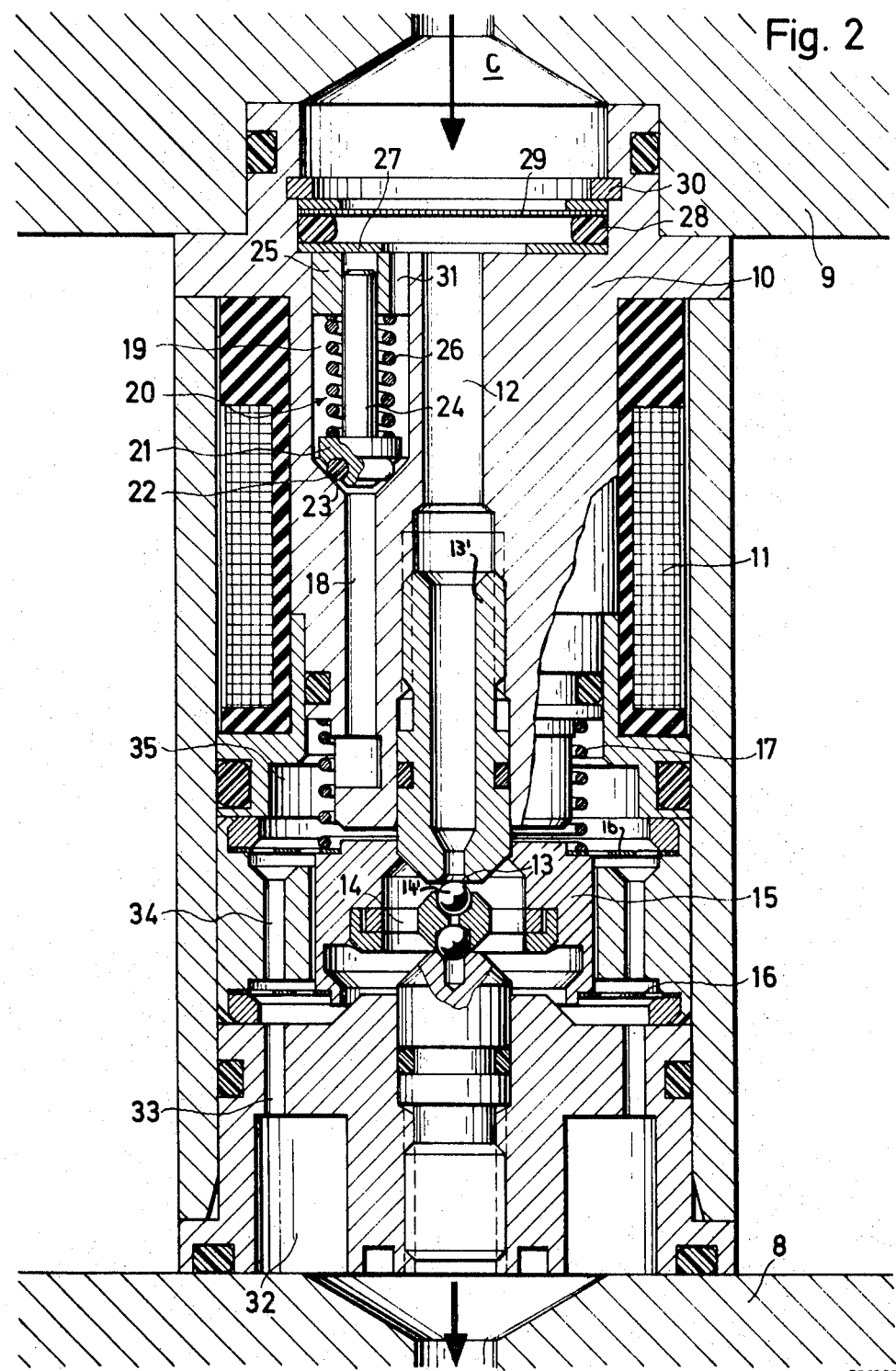
FIG. 2 is an enlarged longitudinal cross section taken through an inlet valve assembly constructed according to the present invention.

The valve 7 operates as a check valve to normally prevent flow of fluid under pressure from the master cylinder 3 to the slave cylinder of the wheel 4 but to allow reverse flow to take place and to thus bypass the inlet valve I should conditions which could lead to a check valve action occur in the latter. FIG. 2 illustrates a preferred embodiment of a combined inlet valve and check valve arrangement according to the invention.

In FIG. 2, the valve assembly is shown as mounted between plate or body members 8 and 9 and to include a cylindrical pole piece 10 about which is disposed an electromagnetic winding 11 adapted to be energized by the control circuitry of the brake system. The pole piece 10 is provided with a centrally disposed and longitudinally extending bore 12 within a counterbore portion with which a valve seat member 13' is threadedly engaged. The valve seat member 13' has a bore therethrough terminating at its lower end in a conical seat portion 13 with which a ball member 14' or other suitable valve element is adapted to engage, thereby isolating the wheel slave cylinder from the master cylinder when the winding 11 is energized.

The element 14' is carried by a suitable spider 14 affixed to the armature 15 and the armature is arranged to be influenced by the winding 11 and pole piece 10 to carry the valve member 14' into seating engagement against the seat 13. The movable armature 15 is located between a pair of perforated spring discs 16, and a compression spring 17 is arranged to normally urge the armature 15 in a direction to maintain the valve in its normally open condition, this being opposite to the direction of movement produced by energization of the winding 11.

The discs 16 are perforated to place the chamber 35 in communication, through the passages 34, with the passage 33 and chamber 32 at the wheel slave cylinder side of the inlet valve, it being noted that the bore 12 also communicates with the chambers 32 through the passages 33 when the inlet valve is in its open condition.

A secondary bore 18 is provided within the pole piece 10 and an upper, counterbored portion thereof contains the check valve assembly indicated generally by the reference character 20 and including an enlarged head portion 21 provided with an annular, resilient sealing member 22 which is normally urged, under the action of a spring 26 surrounding the stem 24, to engage the check valve seat 23 substantially as shown. The upper portion of the counterbore receives a collar or sleeve 25 which guides the upper portion of the stem 24 and which is provided with a semicircular groove 31 at one side to establish communication between the secondary bore 18 and the inlet chamber C, the chamber C being in direct communication with the master cylinder through the main pressure line 1. The collar 25 is retained in place by means of an annular washer 27 maintained in seated engagement with the upper end of the pole piece 10 through the intermediary of a resilient annular ring 28, a screen 29 and a lock ring 30.

As has been discussed, the current available for energizing the winding 11 is of relatively low value and consequently, in order to influence the armature 15 to close the inlet valve quickly enough for proper control operation, the armature and associated spider 14 and valve element 14' are made of as small a size as possible, so as to possess relatively low inertia, and the spring 17 is arranged to only lightly urge the armature into the normally open valve condition when the winding 11 is deenergized. As a result, a sudden reduction in fluid pressure in the bore 12 may cause the inlet valve to be forced into its closed condition or, if the inlet valve is already closed, such reduction in pressure may cause the inlet valve to remain in its closed condition, neither of which situations is desirable since the purpose of pressure reduction in the bore 12, caused by the operator's action on the master cylinder, will be defeated by virtue of the relatively high pressure being retained within that portion of the system between the inlet valve and the slave cylinder of the wheel. However, the check valve assembly 20 will, under either of these circumstances, allow the fluid to bypass the inlet valve so that the intended reduction in brake fluid pressure is effected at the slave cylinder.

It will be understood that the above description of the present invention is susceptible to various modifications, changes and adaptations.

I claim:

1. In an antilocking control system for vehicle brakes having an operator-controlled master cylinder, a pressure line for transmitting brake fluid pressure established at the master cylinder to an associated wheel brake, a normally open inlet valve in the pressure line, a return line for returning pressurized brake fluid from said wheel brake to said master cylinder, a normally closed outlet valve in the return line, means for detecting a braking condition of the wheel, and actuating means responsive to the output of said means for detecting for selectively opening and closing the inlet and outlet valves subsequent to operation of the master cylinder to automatically control the brake fluid pressure acting on the wheel brake to prevent locking of the wheel, the improvement comprising, in combination, valve means connected in parallel with said inlet valve for passing brake fluid around said inlet valve in a direction to reduce the pressure at said wheel brake in response to sudden reductions in pressure at said master cylinder.

2. An arrangement as defined in claim 1 wherein said valve means is constituted by a check valve connected to pass fluid in a direction from said wheel brake to said master cylinder.

3. An arrangement as defined in claim 2 wherein said inlet valve and said check valve are constructed as a single unit.

4. An arrangement as defined in claim 1 wherein said actuating means includes an electromagnet for opening and closing said inlet valve, said electromagnet having a pole piece provided with a bore therethrough and a movable armature having a valve member positioned to block said bore, said pole piece having a second bore in parallel with the first bore and said valve means being disposed in said second bore.

5. An arrangement as defined in claim 4 wherein said valve means comprises a check valve having a stem and a guide collar mounted in said second bore and guidingly receiving said stem, and said guide collar having a longitudinal groove therein establishing communication of said second bore.

6. An arrangement as defined in claim 1 wherein the movable element of said valve is located between the valve seat thereof and the associated wheel brake so that the flow direction from the master cylinder to the wheel brake coincides with the opening direction of the valve.

7. In an antilocking control system for vehicle brakes of the type including: a master cylinder controlled by the vehicle operator; a pressure line for transmitting brake fluid pressure established at the master cylinder to an associated wheel brake; an electromagnetically actuatable inlet valve in the pressure line including a valve seat and a valve member; a return line for returning pressurized brake fluid from said wheel brake to said master cylinder; a normally closed outlet valve in the return line; means for detecting a braking condition of the wheel; control means responsive to the output of said means for detecting for opening and closing said inlet and outlet valves subsequent to operation of the master cylinder to automatically control the brake fluid pressure acting on the wheel brake, said valve member adapted, in response to energization of the inlet valve by said control means incidental to operator-controlled actuation of the master cylinder, to be movable against the seat to isolate the wheel brake from the master cylinder and normally oriented to freely pass brake fluid from the master cylinder to the wheel brake, whereby an operator-induced sudden reduction in brake fluid pressure at the master cylinder while the inlet valve is closed tends to maintain the valve member against said seat despite deenergization of the inlet valve, the improvement comprising, in combination, valve means connected in parallel with said electromagnetically actuatable inlet valve for bypassing the latter in the event of such sudden reduction in the brake pressure at the master cylinder for enabling the brake to respond to such sudden cessation or drastic reduction of braking effort.

8. An antilocking control system for vehicle brakes as defined in claim 7 wherein said valve member is located between said valve seat and the outlet of said inlet valve.

* * * * *